United States Patent
Li et al.

(10) Patent No.: US 12,039,299 B2
(45) Date of Patent: Jul. 16, 2024

(54) COMPUTER PROCESS MANAGEMENT

(71) Applicant: International Business Machines Corporation, Armonk, NY (US)

(72) Inventors: Shuo Li, Beijing (CN); Xiaobo Wang, Beijing (CN); Hong Mei Zhang, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 17/096,481

(22) Filed: Nov. 12, 2020

(65) Prior Publication Data

US 2022/0147325 A1 May 12, 2022

(51) Int. Cl.
*G06F 8/35* (2018.01)
*G06F 8/33* (2018.01)
*G06F 40/289* (2020.01)
*G06Q 10/067* (2023.01)

(52) U.S. Cl.
CPC .................. *G06F 8/35* (2013.01); *G06F 8/33* (2013.01); *G06F 40/289* (2020.01); *G06Q 10/067* (2013.01)

(58) Field of Classification Search
CPC ............ G06F 8/33; G06F 8/35; G06F 40/289; G06Q 10/067
See application file for complete search history.

(56) References Cited

U.S. PATENT DOCUMENTS

| | | | |
|---|---|---|---|
| 8,880,620 B2 | 11/2014 | De Souza | |
| 11,435,871 B1 * | 9/2022 | Luvaas | G06F 8/36 |
| 2003/0018512 A1 * | 1/2003 | Dortmans | G06Q 10/06 718/100 |
| 2004/0254989 A1 | 12/2004 | Baratakke | |
| 2014/0304027 A1 * | 10/2014 | Wu | G06Q 10/0633 705/7.27 |
| 2017/0039246 A1 | 2/2017 | Bastide | |
| 2017/0329506 A1 * | 11/2017 | Laetham | G06F 8/31 |
| 2018/0373795 A1 | 12/2018 | Chasse | |

(Continued)

FOREIGN PATENT DOCUMENTS

CN 103106573 A 5/2013

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

*Primary Examiner* — S. Sough
*Assistant Examiner* — Stephen D Berman
(74) *Attorney, Agent, or Firm* — Matthew Zehrer

(57) ABSTRACT

In an embodiment, a computer-implemented method comprises identifying a theme of a process based on a set of communication information. The set of communication information is generated corresponding to performing the process. The method further comprises determining a plurality of roles in the process at least partly based on the set of communication information. The plurality of roles performs respective actions during performing the process. The method further comprises generating a framework of the process based on the theme and the plurality of roles. The framework comprises one or more branches. In other embodiments, a system and a computer program product are disclosed.

20 Claims, 9 Drawing Sheets

(56) References Cited

U.S. PATENT DOCUMENTS

2019/0340049 A1* 11/2019 Saha ................... G06F 11/0715
2021/0216358 A1* 7/2021 Rana ..................... G06F 9/4843
2022/0004954 A1* 1/2022 Rafferty ................ G06N 20/00
2022/0107852 A1* 4/2022 Kulkarni ................ G06F 9/542

* cited by examiner

SAMPLE
FRAMEWORK 1

COMPARING

SAMPLE
FRAMEWORK 2

COMMON PROCESS ELEMENTS

COMPUTER PROCESS MANAGEMENT

BACKGROUND

The present invention relates to computer technologies, and more specifically, to a method, system, and computer program product for process management.

Process management is broadly employed in various domains, for instance, business, manufacture, government, or enterprise management, etc. For process management and control, process management software, systems, or applications are provided to satisfy various requirements in process management, for instance, Office Action (OA) Management Systems employed in enterprise internal environments. Generally, it is expensive and complex to deploy professional process management software or systems for effective process management in enterprise environments. For instance, in large-scale enterprises, there are still a lot of new requirements or states in process management which cannot be satisfied by specific process management software or systems. But frequent adjustment or update of the specific process management software or systems is also difficult to be realized in reality. On the other hand, some enterprises may have no sufficient resources to employ professional process management systems for process management and also implement process management and control by communication information, for instance, documents, emails, or messages etc.

SUMMARY

According to some embodiments of the present disclosure, there is provided a method, system, and computer program product for computer process management.

According to one embodiment of the present disclosure, the present disclosure provides a computer-implemented method. The method comprises identifying a theme of a process based on a set of communication information. The set of communication information is generated corresponding to performing the process. The method further comprises determining a plurality of roles in the process at least partly based on the set of communication information. The plurality of roles performs respective actions during performing the process. The method further comprises generating a framework of the process based on the theme and the plurality of roles. The framework comprises one or more branches.

According to another embodiment of the present disclosure, the present disclosure provides a system. The system comprises at least one processing unit and a memory coupled to the at least one processing unit and storing instructions thereon. The instructions, when executed by the at least one processing unit, perform acts which comprise identifying a theme of a process based on a set of communication information. The set of communication information is generated corresponding to performing the process. The acts further comprise determining a plurality of roles in the process at least partly based on the set of communication information. The plurality of roles performs respective actions during performing the process. The acts further comprise generating a framework of the process based on the theme and the plurality of roles. The framework comprises one or more branches.

According to one or more embodiments of the present disclosure, the present disclosure provides a computer program product. The computer program product comprises a computer readable storage medium having program instructions embodied therewith. The program instructions are executable by an electronic device to cause the electronic device to perform acts which comprise identifying a theme of a process based on a set of communication information. The set of communication information is generated corresponding to performing the process. The acts further comprise determining a plurality of roles in the process at least partly based on the set of communication information. The plurality of roles performs respective actions during performing the process. The acts further comprise generating a framework of the process based on the theme and the plurality of roles. The framework comprises one or more branches.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
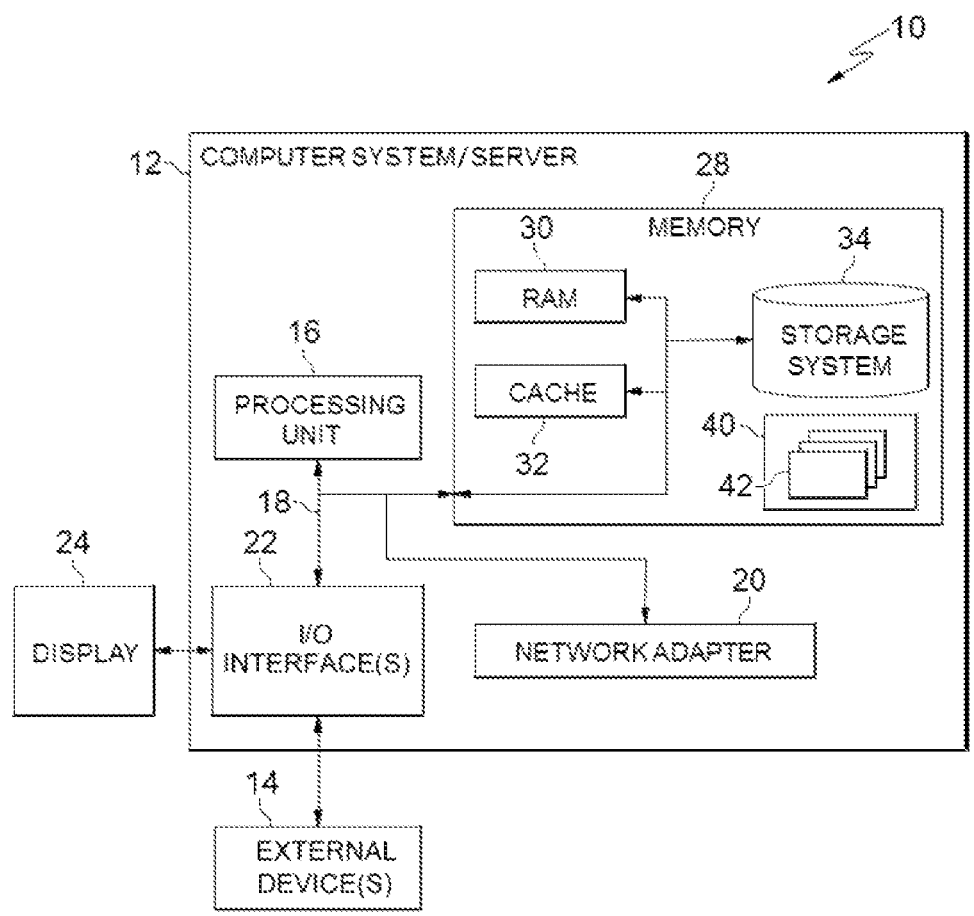
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are applicable over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities applicable for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made applicable to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being performed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any applicable media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination such that, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
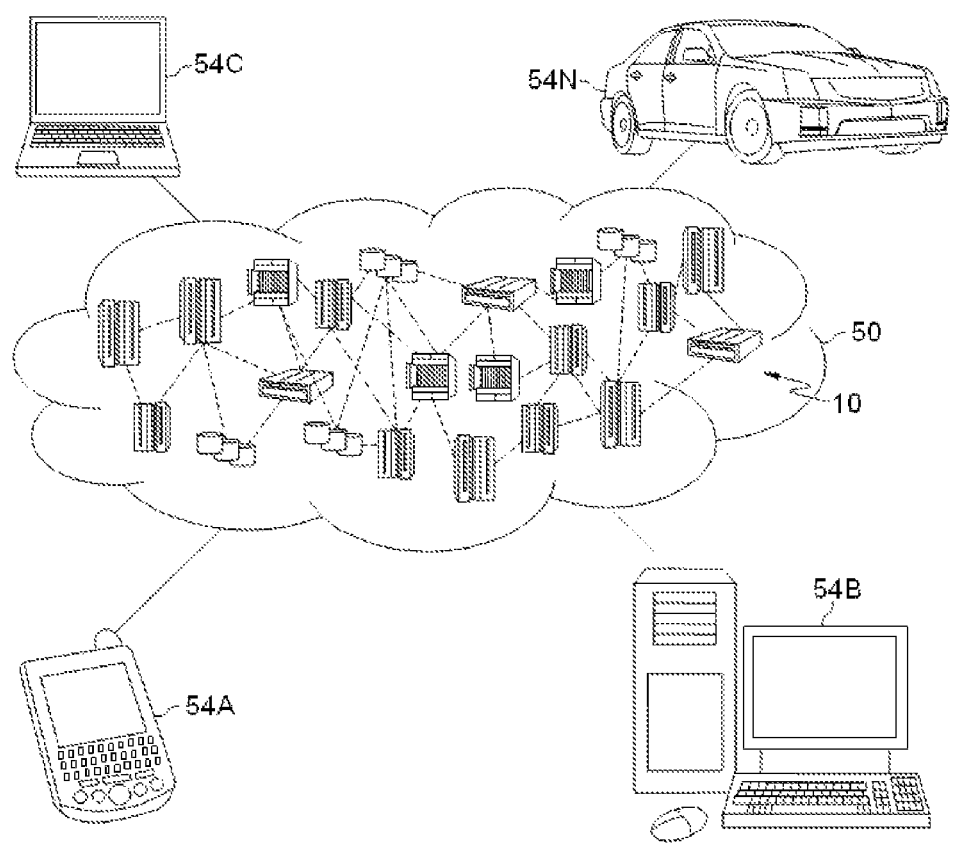
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
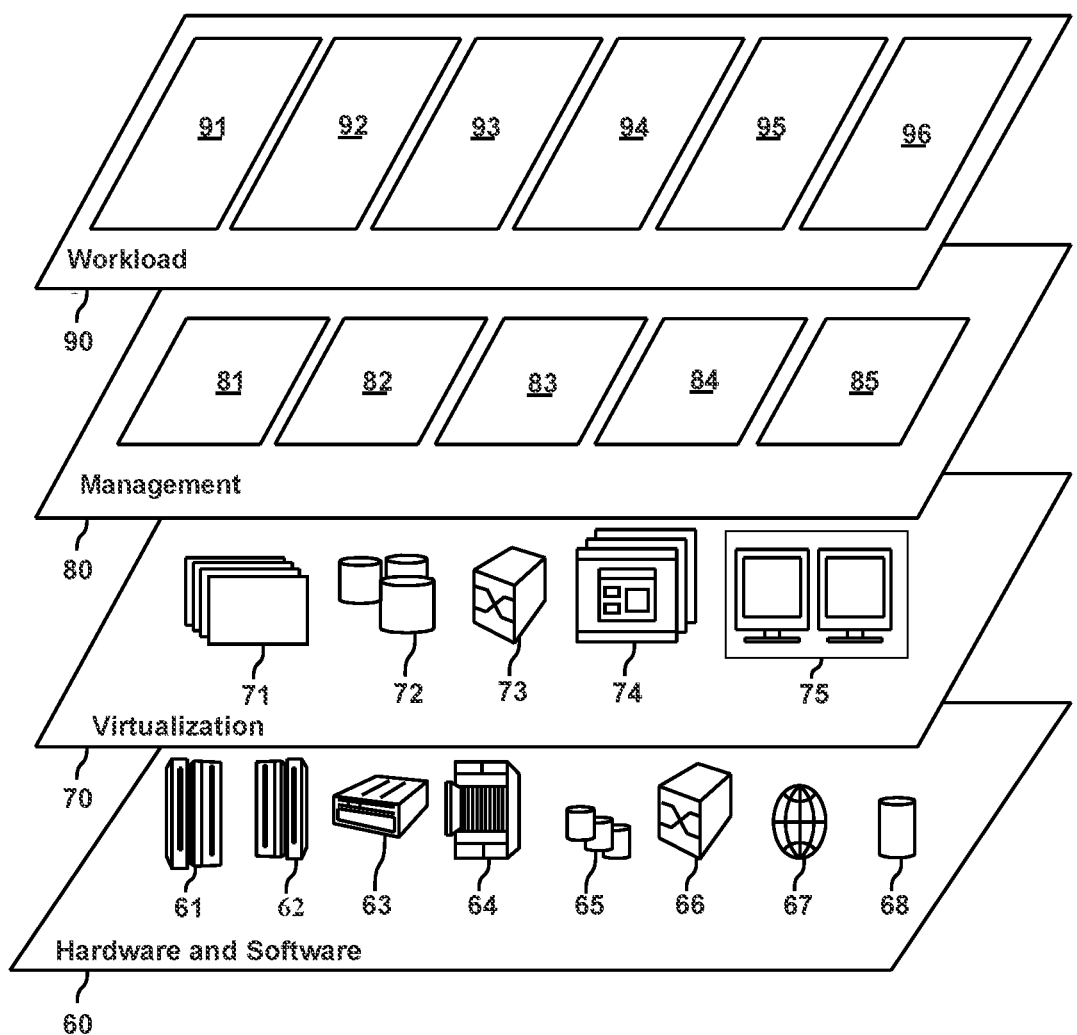
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a feature requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and process management 96 will be described in the following embodiments of the present disclosure.

Process management is broadly employed in various domains, for instance, business, manufacture, government, or enterprise management, etc. For managing and controlling processes, a plenty of process management software, systems, or applications are provided to solve various requirements or problems in process management, for instance, Office Action (OA) Management Systems employed in enterprise internal environments. Generally, it is expensive and complex to deploy a professional process management software or system for effective process management in a specific environment, for instance, in a large-scale enterprise. Furthermore, there are still a lot of new requirements or events in process management which cannot be solved by a specific process management software or system in a complex environment. But frequent adjustment or update of a deployed process management software or system may be often difficult to be realized in reality because the adjustment or update may cause a process being managed and performed to be interrupted. On the other side, some middle or small scaled enterprises may have no sufficient resources to employ professional process management systems for process management and still implement process management and control by means of conventional methods via communication information, for instance, documents, emails, or messages, etc. Therefore, there is a need to solve the aforementioned problems of process management and provide a flexible, adjustable, and cheaper solution to manage various processes based on communication information.

Figure 8:
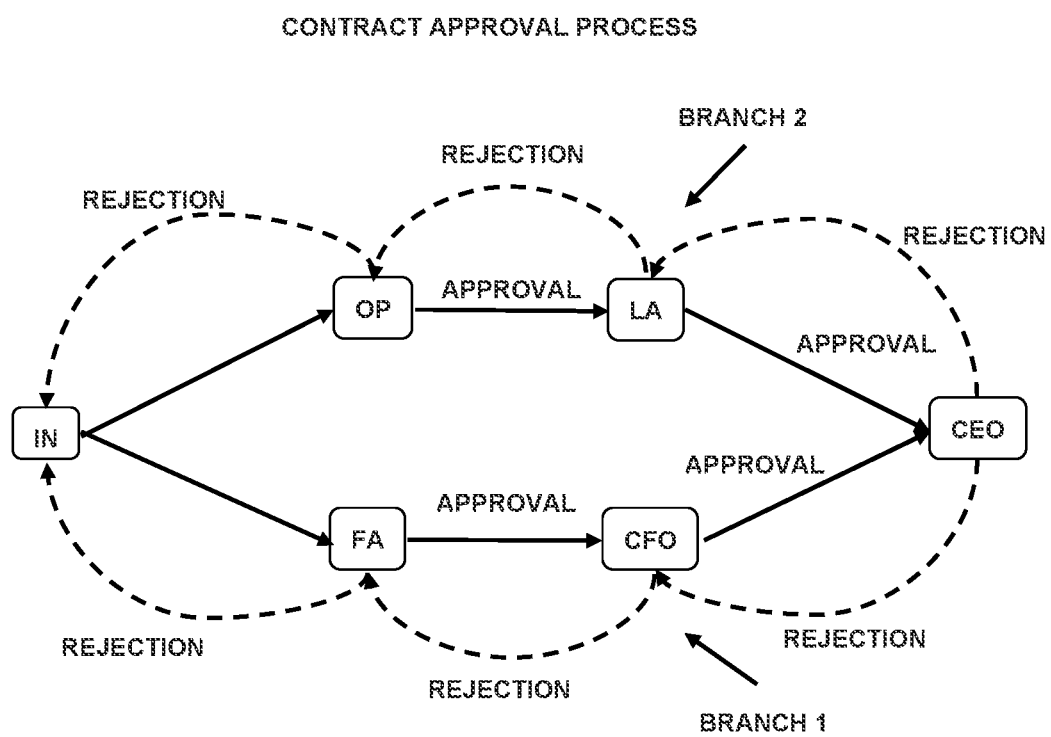
FIG. 8 depicts an exemplary contract approval process according to some embodiments of the present disclosure.

Generally, a process is typically with a plurality of steps (also called "nodes"). With reference now to FIG. 8, an exemplary contract approval process in an enterprise as shown in FIG. 8 comprises the following nodes: an initiation node (abbreviated as "IN") in which an initiator raises a request for contract approval, a finance review node (abbreviated as "FA") in which a finance reviewer may approve or reject the contract based on a review result according to the detailed finance aspect, a CFO review node (abbreviated as "CFO") in which the Chief Financial Officer of the enterprise may approve or reject the contract based on a review result according to the enterprise-level finance aspect, an operation review node (abbreviated as "OP") in which an operation reviewer may approve or reject the contract based on a review result according to the operation aspect, a legal review node (abbreviated as "LA") in which an legal reviewer may approve or reject the contract based on the legal aspect, and a CEO review node (abbreviated as "CEO") in which the Chief Executive Officer may make a final approval or rejection decision to the contract. As mentioned in the above, at each node of a process, a respective role may perform a corresponding action, for instance, an approval or rejection action in the contract approval process, to make the process to proceed to the next node or return to the last node.

Furthermore, a process may be also with one or more sub-processes based on the plurality of nodes and action sequence during performing the process. As shown in FIG. 8, the exemplary contract approval process comprises two sub-processes. The first sub-process (a.k.a., Branch 1) starts from the IN node in which a contract approval request is initiated and sent to a next node, for instance, the FA node. Then the first sub-process proceeds to the FA node and is reviewed by the finance reviewer. The first sub-process may proceed to a next node, for instance, the CFO review node, according to an approval action performed by the finance reviewer, or return to the last node which is the initiation node herein according to a rejection action performed by the finance reviewer. If the first sub-process proceeded to the CFO review node, the first sub-process may continually proceed to a next node, for instance, the CEO review node, according to an approval action performed by the CFO, or return to the last node which is the FA node herein according to a rejection action performed by the CFO. If the first sub-process proceeded to the CEO review node, the first sub-process may be ended at the CEO review node according to an approval action performed by the CEO, or return to the last node which is the CFO review node herein according to a rejection action performed by the CEO. The second sub-process (a.k.a., "Branch 2") of the exemplary contract approval process may be constructed in the similar manner as the first sub-process. The second sub-process may also start from the IN node in which the contract approval request is initiated and sent to a next node which is the OP review node herein. Then the second sub-process proceeds to the OP review node and is reviewed by the operation reviewer. The second sub-process may proceed to a next node, for instance, the LA review node, according to an approval action performed by the operation reviewer, or return to the last node which is the IN node herein according to a rejection action performed by the operation reviewer. If the second sub-process proceeded to the LA review node, the second sub-process may proceed to a next node, for instance, the CEO review node, according to an approval action performed by the legal reviewer, or return to the last node which is the OP review node herein according to a rejection action performed by the legal reviewer. If the second sub-process proceeded to the CEO review node, the second sub-process may also be ended at the CEO review node according to an approval action performed by the CEO, or return to the last node which is the LA review node herein according to a rejection action performed by the CEO.

During performing a process, for instance, the exemplary contract approval process, at each node of the process, a respective role may perform a corresponding action, for instance, an approval or rejection action in the contract approval process, to make the process to proceed to the next node or return to the last node by means of communication information between roles of corresponding nodes, for instance, between the initiator and the finance reviewer, between the finance reviewer and the CFO, or between the CFO and the CEO. During performing a process, a respective role at each node of the process may perform a corresponding action to make the process to proceed to the next node or return to the last node by means of communication information between roles of corresponding nodes. For instance, a respective role may perform an approval or rejection action in the contract approval process to make the process to proceed to the next node or return to the last node by means of the communication information between the initiator and the finance reviewer between the finance reviewer and the CFO, between the finance reviewer and the CFO, or between the CFO and the CEO. The communication information may be in various forms, for instance, hardcopy or softcopy documents, emails, text messages, voice messages, or other applicable forms, and comprise corresponding contents constructed by natural languages, with or without special tags which may be a "approved" or "rejected" tag.

Accordingly, there is a need to address the aforementioned problems in process management, especially to provide an adjustable and flexible solution to manage various processes based on communication information.

Figure 4:
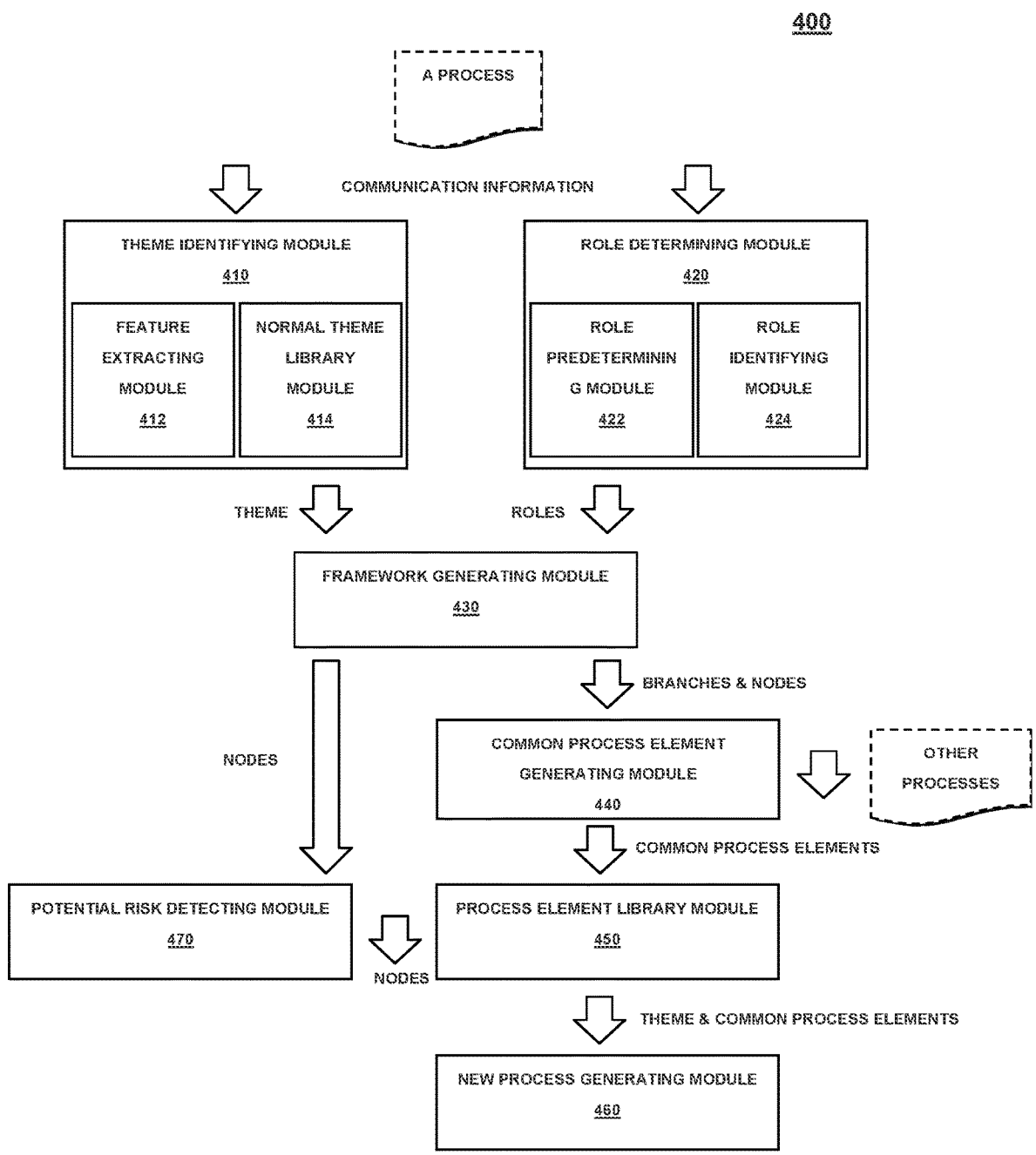
FIG. 4 depicts a block diagram illustrating an exemplary process management system based on communication information according to some embodiments of the present disclosure.

As mentioned in the above, a method, system, and computer program product for process management can be employed in course of managing and controlling a process based on communication information, for instance, a contract approval process in an enterprise. FIG. 4 depicts a block diagram illustrating an exemplary process management system based on communication information according to some embodiments of the present disclosure. It would be recognized that the arrangement of elements or modules in FIG. 4 and the number of elements or modules therein are provided for the purpose of illustration only. In other embodiments, process management system 400 may include greater, fewer, and/or different elements or modules and different arrangements.

According to some embodiments of the present disclosure, a process management system 400 is provided to implement a computer-implemented method for managing processes. Process management system 400 may comprise theme identifying module 410, role determining module 420, framework generating module 430, common process element generating module 440, process element library module 450, new process generating module 460 and potential risk detecting module 470. Furthermore, theme identifying module 410 may comprise feature extracting module 412 and normal theme library module 414. Role determining module 420 may comprise role predetermining module 422 and role identifying module 424. Notwithstanding, process management system 400 depicted in FIG. 4 comprises the aforementioned modules, but there is no limitation provided to modules or elements comprised in process management system 400. Process management system 400 may comprise other modules or elements for implementing more functionalities and objectives in accordance with various user's requirements and experiences.

In some embodiments of the present disclosure, process management system 400 is implemented in a distributed computing environment, for instance, a cluster computing environment, a grid computing environment, a server/client network computing environment, or a cloud computing environment (e.g., cloud computing environment 50, shown in FIG. 2), etc. A distributed computing environment can implement process management system 400 by components of the distributed computing environment comprising hardware, software, or their combinations. According to performance and capability based on a distributed computing environment, process management system 400 can perform the computer-implemented method for process management which will be described in the present disclosure.

In some embodiments of the present disclosure, process management system 400 may be deployed on remote computing platforms, for example, a cloud computing platform and/or a cloud storage service system which can provide remote computing source to implement at least a part of functionalities of process management system 400 and provide respective computing resource, information source or supporting services, for instance, massive remote storage space for process-related dataset. In these embodiments, the remote computing platforms would be resilient and adapted to computing performance, storage capacity, response speed, display effect, and the like in accordance with the user's requirements.

In some embodiments of the present disclosure, process management system 400 comprises theme identifying module 410, role determining module 420, framework generating module 430, common process element generating module 440, process element library module 450, new process generating module 460, and potential risk detecting module 470 which are communicated by means of electronic or wireless connections, for instance, cables, buses, local area network (LAN), general wide area network (WAN), public network (e.g., the Internet), Wi-Fi network, Bluetooth connection, or a combination of them etc.

In some embodiments of the present disclosure, theme identifying module 410 may identify a theme of a process based on a set of communication information which is generated in period of performing the process, for instance, emails or text messages transferred between different roles during performing the process. In some embodiments, for the aforementioned objectives or functionalities, theme identifying module 410 may receive a set of communication information based on a process via a local storage device or a network resource as shown in FIG. 4. The set of communication information may be generated by different roles during performing the process. In the present disclosure, it is defined as communication information that contents of information with various applicable forms may carry and present operations, selections, attitudes, or decisions (collectively called "actions") derived from the different roles during performing the process. The communication information may be constructed with natural languages, formalized statements, predetermined symbols, or their combinations. In some embodiments, theme identifying module 410 may further comprise feature extracting module 412. Feature extracting module 412 may extract theme features from contents of the set of communication information. In some embodiments, for extracting theme features from contents of a set of communication information constructed by natural languages, theme identifying module 410 may employ machine learning algorithms to extract theme features from contents of the set of communication information, for instance, the Latent Dirichlet Allocation (LDA) theme generation algorithm. In some embodiments, theme identifying module 410 may further comprise normal theme library module 414. Normal theme library module 414 may comprise a plurality of normal themes and respective normal theme features corresponding to the plurality of normal themes. In some embodiments, the plurality of normal themes and respective normal theme features corresponding to the plurality of normal themes may be predetermined normal themes and respective normal theme features based on existing theme library resources. In some embodiments, the plurality of normal themes and the respective normal theme features may be the identified themes and the extracted theme features according to previous processes which are performed before the present process. Furthermore, theme identifying module 410 may compare the extracted theme features with the plurality of normal themes and the respective normal theme features stored in normal theme library 414 to obtain a similarity value corresponding to the plurality of normal themes. In response to the similarity value being greater than a preset threshold, theme identifying module 410 may identify the theme of the process based on the plurality of normal themes.

Figure 9:
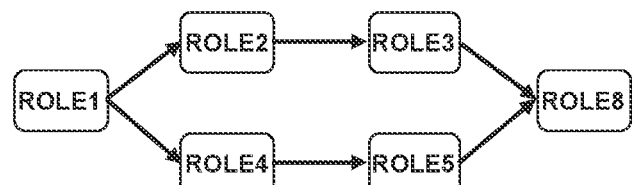
FIG. 9 depicts two exemplary process frameworks and a common process elements according to some embodiments of the present disclosure.
Figure 9:
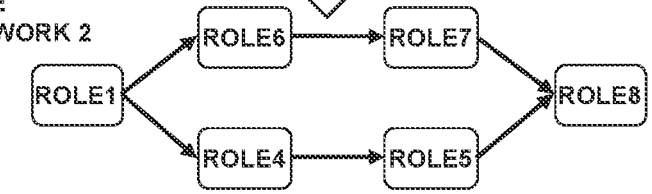
Figure 9:
Figure 9:
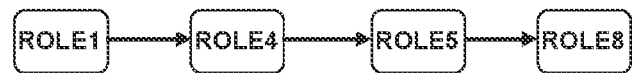

In some embodiments of the present disclosure, role determining module 420 may determine a plurality of roles in the process at least partly based on the set of communication information. The plurality of roles may perform respective actions during performing the process. In some embodiments, for the aforementioned objectives or functionalities, role determining module 420 may receive the set of communication information based on the process as shown in FIG. 4. The set of communication information may carry and present operations, selections, attitudes, or decisions (collectively called "actions") derived from the different roles during performing the process. As mentioned in the above, at each node of the process, a respective role may perform a corresponding action, for instance, an approval or rejection action in a contract approval process, to make the process to proceed to the next node or return to the last node. In some embodiments, role determining module 420 may further comprise role predetermining module 422. Role predetermining module 422 may determine a part of the plurality of roles based on a predetermined role arrangement. As shown in FIG. 9, the contract approval process may comprise six roles from role 1 to role 5 and role 8. The predetermined role arrangement may determine that role 1 is an initiator and role 5 is a Chief Financial Officer. As a result, role predetermining module 422 may determine role 1 is an initiator and role 5 is a Chief Financial Officer based on the predetermined role arrangement. In some embodiments, role determining module 420 may further comprise role identifying module 424. Role identifying module 424 may identify the rest of the plurality of roles based on the predetermined part of the plurality of roles and the set of communication information by means of natural language processing (NLP) with machine learning technology. NLP can use machine learning algorithms (such as, the Word2vec algorithm and the like) to dynamically detect roles based on the set of communication information.

In some embodiments of the present disclosure, framework generating module 430 is in communication with theme identifying module 410 and role determining module 420. Framework generating module 430 may generate a framework of the process based on the theme of the process and the plurality of roles in the process. As mentioned in the above, the theme of the process is identified by theme identifying module 410. The plurality of roles in the process are determined by role determining module 420. The framework of the process comprises one or more branches. Each of the one or more branches is one-to-one corresponding to each of sub-processes of the process as shown in FIG. 8. In some embodiments, the each of the one or more branches comprises a plurality of nodes and a corresponding action performing sequence based on the plurality of nodes, and the each of the plurality of nodes is respectively corresponding to each of the plurality of roles.

In some embodiments of the present disclosure, process management system 400 may further comprise common process element generating module 440. Common process element generating module 440 may generate one or more common process elements based on the framework generated by framework generating module 430. Each of the one or more common process elements may be a branch of the one or more branches comprising the plurality of nodes. In some embodiments, common process element generating module 440 may compare the one or more branches with branches comprised in other frameworks corresponding to other processes. In response to determining one or more same branches comprised in the framework and the other frameworks based on the comparing, common process element generating module 440 may identify the one or more same branches as the one or more common process elements. In some embodiments, common process element generating module 440 may compare the one or more branches with branches comprised in other frameworks corresponding to other processes to identify the one or more common process elements by means of Hamming distance. Details of Hamming distance, which is a known technology in the art, would be omitted herein for abbreviated description.

In some embodiments of the present disclosure, process management system 400 may further comprise process element library module 450. Process management system 400 may store a theme and one or more common process elements corresponding to the theme into process element library module 450. Process element library module 450 can organize and maintain themes and respective common process elements stored therein by means of various dataset management tools or methods. In response to a certificated modification operation, process management system 400 may update process element library module 450 by means of modifying the themes or the respective common process elements stored therein. In some embodiments, process management system 400 may perform various normal file/data modification operation, for instance, adding, deleting, copying, moving, revising, etc., to modify the stored themes or common process elements. In some embodiments, process management system 400 may perform various dataset operation, for instance, sorting, fliting, combination, grouping, clustering, summarizing etc., to modify the stored themes or common process elements. In some embodiments, the process management system 400 can share the themes or the common process elements stored in process element library module 450 with other systems, applications, or users via network, cloud, or other applicable communication ways.

In some embodiments of the present disclosure, process management system 400 may further comprise new process generating module 460. New process generating module 460 may generate a new process based on themes and common process elements stored in process element library module 450. In some embodiments, new process generating module 460 can be directly communicated with common process element generating module 440 to obtain the themes and the one or more common process elements generated by common process element generating module 440. In some embodiments, new process generating module 460 can obtain modified themes or common process elements from an updated process element library module 450 and generate a new process based on the updated process element library 450. New process generating module 460 may have a visual user interface to operation and generate a new process, and the themes and the common process elements can be displayed and operated graphically by means of the visual user interface. New process generating module 460 may select applicable themes and respective comment process elements according to user's requirements to construct a new process.

In some embodiments of the present disclosure, process management system 400 may further comprise potential risk detecting module 470. Potential risk detecting module 470 may extract action results at the plurality of nodes based on respective communication information corresponding to each of the plurality of nodes (e.g., roles). The action results at the plurality of nodes are at least partly presented with natural languages in the respective communication information. For instance, the finance reviewer in the aforementioned contract approval process sent an email to the initiator. The email comprises some feature words or sentences corresponding to the action results, for instance, "I found a problem on this contract", "I have some concerns on this matter", "I agree with your opinions", "I approved your contract", "You need revise your contract", etc. Potential risk detecting module 470 may extract the feature words or sentences comprised in the email as an action result at the node of the finance reviewer. The applicable feature words or sentences extracting methods include Term Frequency-Inverse Document Frequency (TF-IDF) which is a known information search and mining technology in the art. Furthermore, potential risk detecting module 470 may determine negative results based on the extracted action results by means of natural language emotion analysis (NLEA). In some embodiments, potential risk detecting module 470 may further extract feature words which can present a kind of emotions/attitudes to a thing or a request, for instance, "problem", "concerns", "agree", "approved", "revise", etc. Then potential risk detecting module 470 may determine positive, neutral, or negative emotions/attitudes presented by the feature words by means of NLEA. For instance, the words "concerns" or "problem" may present a negative emotion/attitude. Conversely, words "agree" or "approved" may present a positive emotion/attitude. The word "revise" may present a neutral emotion/attitude at common statuses. Natural language emotion analysis methods may include various machine learning algorithms in the art based on Naïve Bayes, MaxEnt, or Support Vector Machines (SVM), etc. The particular details of NLEA would be omitted herein for abbreviated description. Potential risk detecting module 470 may further record the negative results into a statistical record. In some embodiments, the statistical record may be a statistics matrix which comprises all of the plurality of nodes in the process. Potential risk detecting module 470 may further identify potential risk nodes in the process based on the statistical record. In some embodiments, the potential risk nodes may have high occurrence probabilities of the negative results. For instance, it means that the node of the legal reviewer is a potential risk node if the probability of the negative result at the node of the legal reviewer is higher than 50% based on the statistical record in the aforementioned contract approval process. For avoiding the negative result at the node of the legal reviewer, initiators need to fully prepare the contract from the legal-related aspect. Therefore, potential risk detecting module 470 can increase process performing efficiency by means of identifying potential risk nodes in processes to caution potential issues before/during performing the process and help users of process management system 400 to avoid the potential issues in the process.

It would be noted that the process management system based on communication information referred to as process management system 400 according to some embodiments of this disclosure could be implemented by computer system/server 12 as shown in FIG. 1 and distributed cloud computing environment 50 as shown in FIGS. 2 and 3, for instance, a plurality of cloud computing nodes 10 perform the process management in distributed cloud computing environment 50 which further comprise respective cloud components implementing functions such as process element library module 450. Here, process management system 400 is exemplarily and abstractly illustrated by a block diagram which does not explicitly exhaust or precisely limit entirety or components of process management system 400 as shown in FIG. 4. Furthermore, it would be recognized that number and arrangement of elements or modules (e.g., the number of elements or modules and the arrangement thereof) in FIG. 4 are provided for the purpose of illustration only. Process management system 400 may comprise greater, fewer, and/or different elements or modules and different arrangements which can be implement by means of hardware, software, or combination of the both. An element or module can also be merged with other elements or modules to construct a new element or module which can implement all functions of the merged elements or modules, for instance, theme identifying module 410 and role determining module 420 can be merged together to construct a new module, or be split into two or more independent elements or modules which respective implement a part of functions of the element or module.

Figure 5:
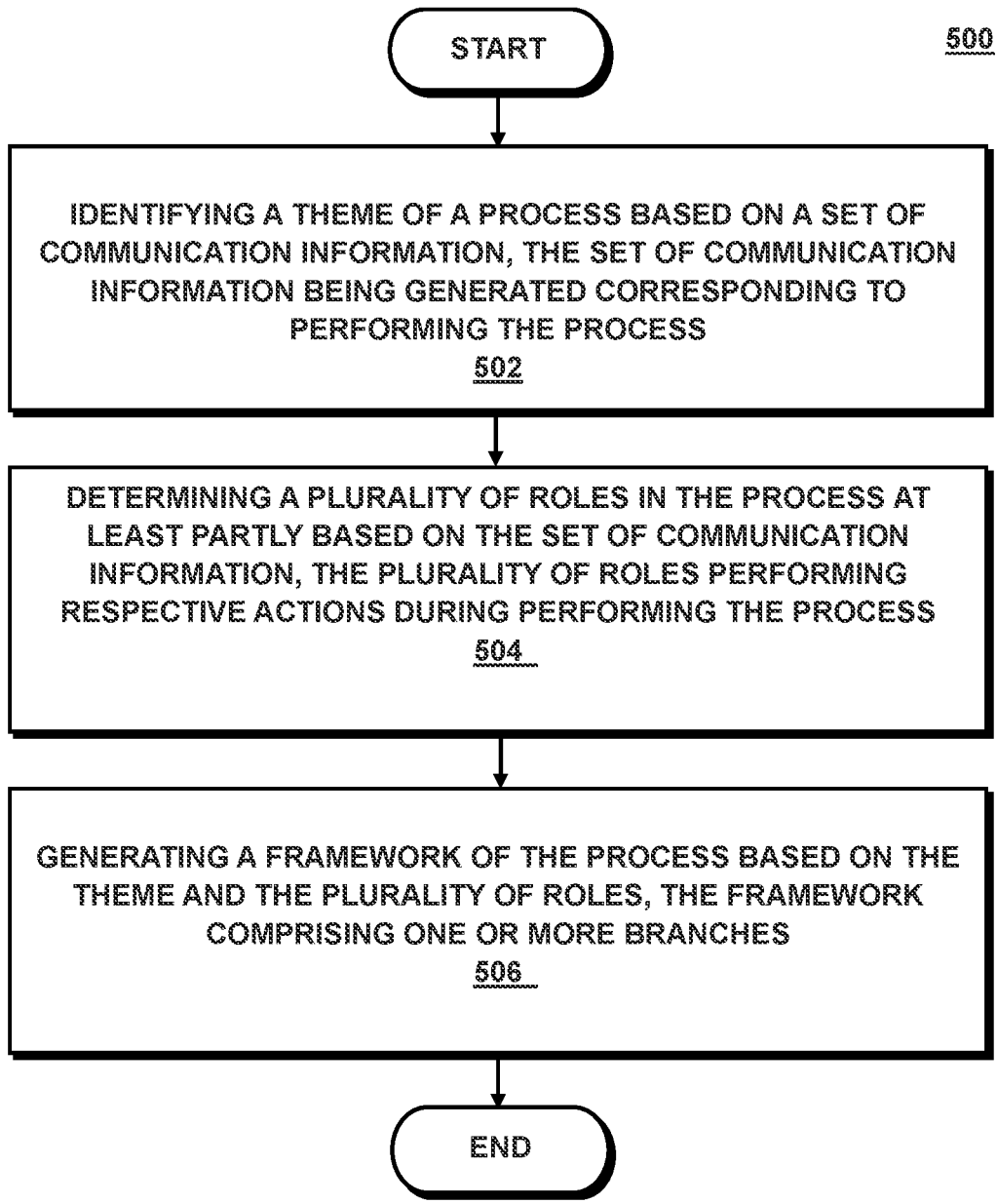
FIG. 5 depicts a flow chart illustrating an exemplary method for process management according to some embodiments of the present disclosure.

With reference now to FIG. 5, in which a process flow chart 500 of a method for process management is depicted according to embodiments of the present disclosure. The process flow chart 500 is a corresponding method implemented by process management system 400 described herein by means of one or more processors in a cloud computing system as shown in FIGS. 1, 2, and 3.

At block 502, process management system 400 may identify a theme of a process based on a set of communication information. The set of communication information is generated corresponding to performing the process. The set of communication information includes, for instance, emails or text messages transferred between different roles during performing the process. In the present disclosure, it is defined as communication information that contents of information with various applicable forms may carry and present operations, selections, attitudes, or decisions (collectively called "actions") derived from the different roles during performing the process. The communication information may be constructed with natural languages, formalized statements, predetermined symbols, or their combinations.

At block 504, process management system 400 may determine a plurality of roles in the process at least partly based on the set of communication information. The plurality of roles may perform respective actions during performing the process. At each node of the process, a respective role may perform a corresponding action, for instance, approval or rejection in the contract approval process as shown in FIG. 8, to make the process to proceed to the next node or return to the last node. Process management system 400 may determine a part of the plurality of roles based on a predetermined role arrangement. Process management system 400 may identify the rest of the plurality of roles based on the predetermined part of the plurality of roles and the set of communication information by means of natural language process (NLP) with machine learning technology. NLP can provide machine learning algorithms to dynamically detect roles based on communication information, for instance, the Word2vec algorithm and the like.

At block 506, process management system 400 may generate a framework of the process based on the theme of the process and the plurality of roles in the process. The framework of the process comprises one or more branches. Each of the one or more branches is one-to-one corresponding to each of sub-processes of the process. In some embodiments, the each of the one or more branches comprises a plurality of nodes and a corresponding action performing sequence based on the plurality of nodes, and the each of the plurality of nodes is respectively corresponding to each of the plurality of roles.

It should be noted that the processing of process management is exemplarily and abstractly illustrated by the process flow chart 500 which does not explicitly exhaust or precisely limit entirety or components of the method of process management as shown in FIG. 5.

With reference now to FIG. 9, in which some exemplary process frameworks generated by process management system 400 are depicted according to embodiments of the present disclosure. Exemplary framework 1 comprises two branches. One of the two branches comprises four nodes which are respectively corresponding to role 1, role 2, role 3 and role 8. Another of the two branches comprises four nodes which are respectively corresponding to role 1, role 4, role 5 and role 8.

As shown in FIG. 9, sample framework 1 further comprises a corresponding action performing sequence based on role 1 to 8. Role 1 may perform a process initiation action, then role 2 and role 4 may respectively perform a corresponding action. Role 3 may perform a corresponding action after role 2 performed the corresponding action, and role 5 may perform a corresponding action after role 4 performed the corresponding action. As a result, role 8 may perform a corresponding action after role 3 and 5 performed respective actions. Sample framework 2 also comprises two branches comprising six nodes, and further comprises a corresponding action performing sequence in the same manner as sample framework 1.

Figure 6:
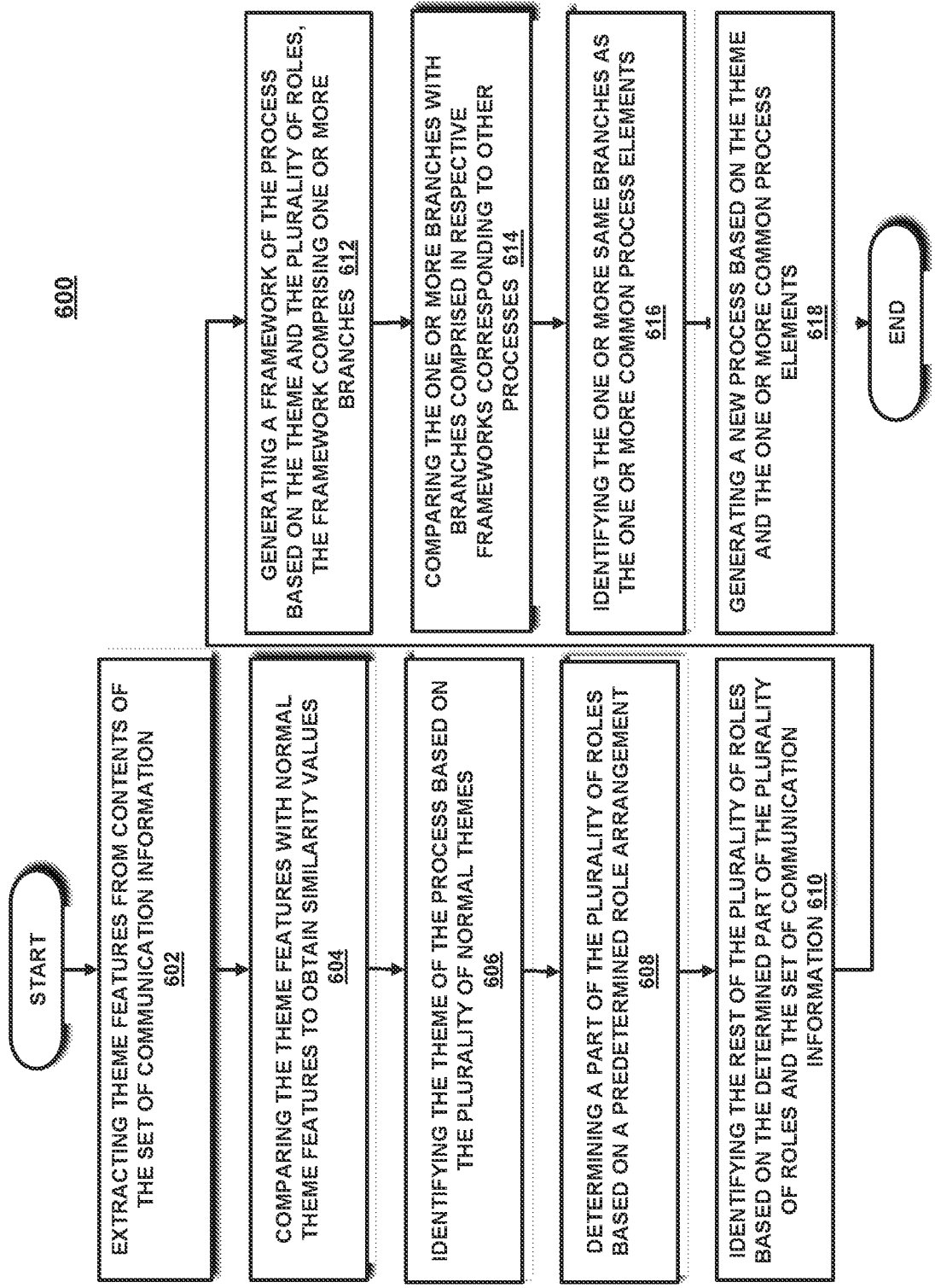
FIG. 6 depicts a flow chart illustrating another exemplary method for process management according to some embodiments of the present disclosure.

With reference now to FIG. 6, a process flow chart 600 of an exemplary method for process management based on communication information is depicted according to embodiments of the present disclosure. The exemplary method depicted by the process flow chart 600 can be implemented by a computing system as process management system 400 shown in FIG. 4 and comprises the method for process management as shown in FIG. 5.

At block 602, process management system 400 may extract theme features from contents of the set of communication information. In some embodiments, for extracting theme features from contents of the set of communication information constructed by natural languages, process management system 400 may employ machine learning algorithms to extract theme features from contents of the set of communication information, for instance, the Latent Dirichlet Allocation (LDA) theme generation algorithm.

At block 604, process management system 400 may compare the extracted theme features with a plurality of normal themes and respective normal theme features stored in a normal theme library to obtain a similarity value corresponding to the plurality of normal themes.

At block 606, process management system 400 may identify the theme of the process based on the plurality of normal themes in response to the similarity value being greater than a preset threshold. There is an exemplary program logic disclosed to describe how to identify a theme of a process based on a set of communication information at the following:

```
from sklearn.feature_extraction.text import TfidfVectorizer
from sklearn.decomposition import LatentDirichletAllocation
tfidf = TfidfVectorizer( )
tfidf_matrix = tfidf.fit_transform(corpus)
tfidf_matrix
lda = LatentDirichletAllocation(n_topics=2, random_state=123456)
docres = lda.fit_transform(tfidf_matrix)
result:
mail 1.txt [0.91159844, 0.08840156], normal theme 1
mail 2.txt [0.93385048, 0.06614952], normal theme 1
mail 3.txt [0.06859599, 0.93140401], normal theme 2
mail 4.txt [0.06916256, 0.93083744], normal theme 2
```

As disclosed in the above exemplary program logic, a set of communication information which is generated corresponding to performing a process, for instance, mail 1 which is a .txt type file and may comprise a set of communication information corresponding to a process, may be identified by process management system 400 to respectively obtain two similarity values corresponding to normal theme 1 or 2. Normal theme 1 and 2, with respective normal theme features corresponding to normal theme 1 and 2, are stored in the normal theme library. The preset threshold is 0.9. The similarity value of mail 1 corresponding to normal theme 1 is 0.91159844, thus the similarity value is greater than the preset threshold. Therefore, process management system 400 may identify the theme of the process corresponding to mail 1 according to normal theme 1. The themes of the processes corresponding to mail 2, 3 and 4 may be identified by process management system 400 in the same manner.

At block 608, process management system 400 may determine a part of the plurality of roles based on a predetermined role arrangement. As shown in FIG. 8, the contract approval process may comprise six roles from role 1 to role 6. The predetermined role arrangement may determine that role 1 is an initiator and role 5 is a Chief Financial Officer. As a result, process management system 400 may determine role 1 is an initiator and role 5 is a Chief Financial Officer based on the predetermined role arrangement.

At block 610, process management system 400 may identify the rest of the plurality of roles based on the predetermined part of the plurality of roles and the set of communication information by means of natural language processing (NLP). NLP can provide machine learning algorithms (such as the Word2vec algorithm and the like) to dynamically detect roles based on communication information, for instance. In some embodiments, by means of the Word2vec algorithm, process management system 400 may detect and identify that role 2 is a finance reviewer based on the set of communication information and the determined role 1 and 5. The Word2vec algorithm can identify role 4 as a finance reviewer if a vector difference between role 4 and the corresponding connection information of role 4 is equal to a vector difference between role 1 and the corresponding connection information of role 1, or equal to a vector difference between role 5 and the corresponding connection information of role 5.

At block 612, process management system 400 may generate a framework of the process based on the theme of the process and the plurality of roles in the process. The framework of the process comprises one or more branches. Each of the one or more branches is one-to-one corresponding to each of sub-processes of the process. In some embodiments, the each of the one or more branches comprises a plurality of nodes and a corresponding action performing sequence based on the plurality of nodes, and the each of the plurality of nodes is respectively corresponding to each of the plurality of roles.

At block 614, process management system 400 may compare the one or more branches with branches comprised in other frameworks corresponding to other processes. Each of the one or more common process elements may be a branch of the one or more branches comprising the plurality of nodes.

At block 616, in response to determining one or more same branches comprised in the framework and the other frameworks corresponding to the other processes, process management system 400 may identify the one or more same branches as the one or more common process elements. In some embodiments, process management system 400 may compare the one or more branches with those branches comprised in other frameworks corresponding to other processes to determine the one or more common process elements by means of Hamming distance. For instance, two branches are respectively constructed as corresponding character strings, then process management system 400 may compare the corresponding character strings by means of Hamming distance to determine whether the corresponding character strings are same. As a result, process management system 400 can identify the same two branches as a common process elements. How to determine same character strings by means of Hamming distance is a known technology in the art and would be omitted herein for abbreviated description.

With reference now to FIG. 9, in which two exemplary process frameworks and common process elements generated by process management system 400 are depicted according to embodiments of the present disclosure. Exemplary framework 1 comprises two branches. One of the two branches comprises four nodes which are respectively corresponding to role 1, role 2, role 3 and role 8, and a corresponding action performing sequence. Another of the two branches comprises four nodes which are respectively corresponding to role 1, role 4, role 5 and role 8, and a corresponding action performing sequence. Similarly, exemplary framework 2 also comprises two branches. One of the two branches comprises four nodes which are respectively corresponding to role 1, role 6, role 7 and role 8, and a corresponding action performing sequence. The other one comprises four nodes which are respectively corresponding to role 1, role 4, role 5 and role 8, and a corresponding action performing sequence. Process management system 400 can compare the branches of exemplary framework 1 with the branches of exemplary framework 1 to determine same branches comprised in exemplary framework 1 and 2, for instance, by means of Hamming distance. As shown in FIG. 9, process management system 400 finally determines the same branches which comprise four same nodes corresponding to role 1, role 4, role 5 and role 8 and a same action performing sequence corresponding to the four same nodes. As a result, process management system 400 can identify the branch, which comprises the four nodes corresponding to role 1, role 4, role 5 and role 8, as the one or more common process elements.

At block 618, process management system 400 may generate a new process based on the theme and the common process elements. In some embodiments, process management system 400 may store themes and common process elements from various processes into a process element library. Process management system 400 may obtain themes and common process elements to generate a new process based on a process element library and user's requirements.

Figure 7:
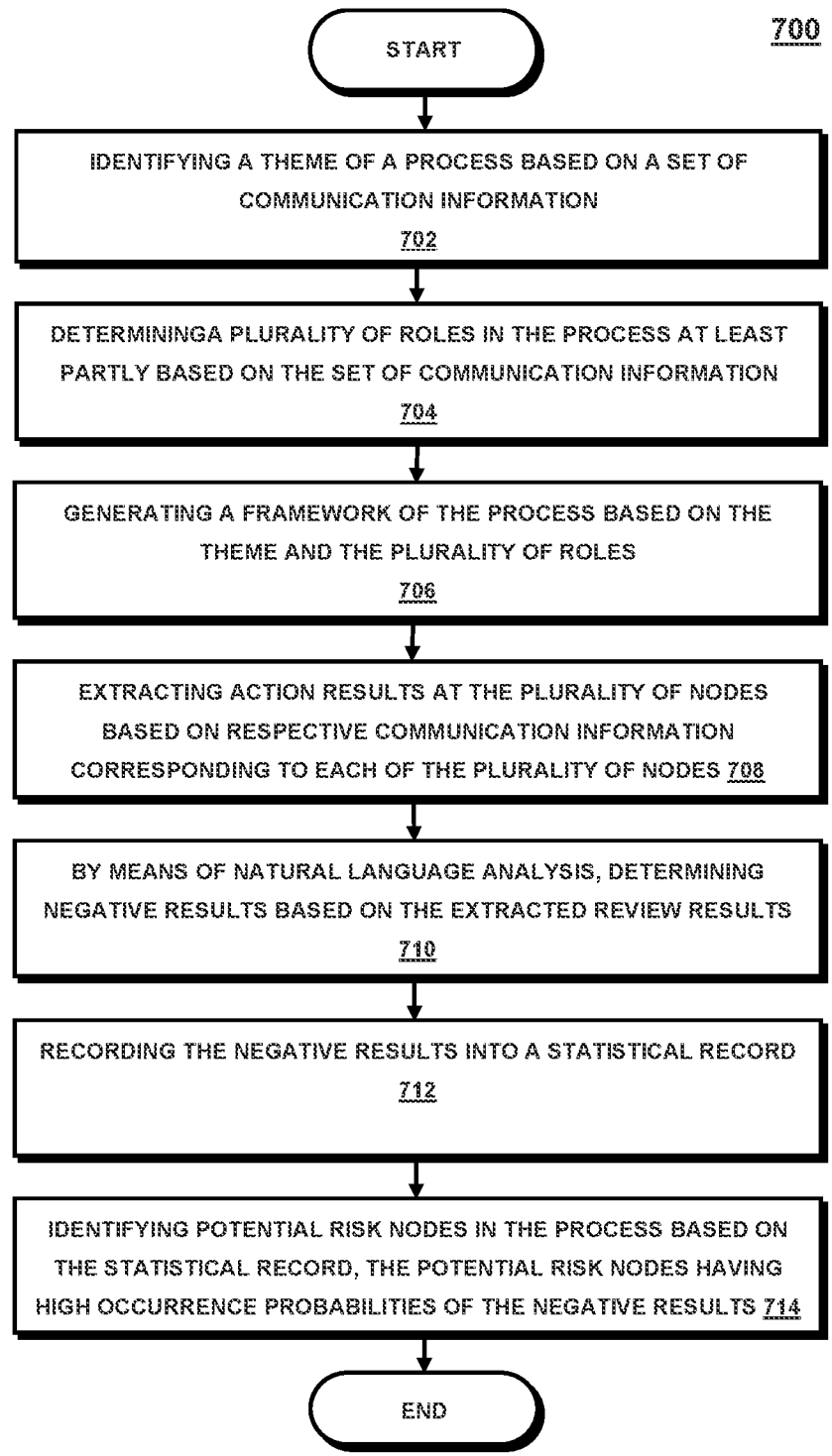
FIG. 7 depicts a flow chart illustrating another yet exemplary method for process management according to some embodiments of the present disclosure.

With reference now to FIG. 7, in which a process flow chart 700 of an exemplary method of identifying potential risk nodes for process management is depicted according to some embodiments of the present disclosure. The exemplary method depicted by the process flow chart 700 can be implemented by a computing system as process management system 400 shown in FIG. 4 and comprises the method for process management as shown in FIG. 5.

At block 702, process management system 400 may identify a theme of a process based on a set of communication information. The set of communication information is generated corresponding to performing the process. In the present disclosure, it is defined as communication information that contents of information with various applicable forms may carry and present operations, selections, attitudes, or decisions (collectively called "actions") derived from the different roles during performing the process. The communication information may be constructed with natural languages, formalized statements, predetermined symbols, or their combinations.

At block 704, process management system 400 may determine a plurality of roles in the process at least partly based on the set of communication information. The plurality of roles may perform respective actions during performing the process. At each node of the process, a respective role may perform a corresponding action to make the process to proceed to the next node or return to the last node.

At block 706, process management system 400 may generate a framework of the process based on the theme of the process and the plurality of roles in the process. The framework of the process comprises one or more branches. Each of the one or more branches is in one-to-one correspondence to each of sub-processes of the process. In some embodiments, the each of the one or more branches comprises a plurality of nodes and a corresponding action performing sequence based on the plurality of nodes, and the each of the plurality of nodes corresponds to respective one of the plurality of roles.

At block 708, process management system 400 may extract action results at the plurality of nodes based on respective communication information corresponding to each of the plurality of nodes. The action results at the plurality of nodes are at least partly presented with natural languages in the communication information. For instance, as shown in FIG. 8, the finance reviewer in the aforementioned contract approval process sent emails to the initiator. The email comprises some feature words or sentences corresponding to the action results, for instance, "I found a problem on this contract", "I have some concerns on this matter", "I agree with your opinions", "I approved your contract", "You need revise your contract" etc. Potential risk detecting module 470 may extract the feature words or sentences comprised in the email as an action result at the node of the finance reviewer. The applicable feature words or sentences extracting methods may include Term Frequency-Inverse Document Frequency (TF-IDF) which is a known information search and mining technology in the art.

At block 710, process management system 400 may determine negative results based on the extracted action results by means of natural language emotion analysis. In some embodiments, process management system 400 may further extract feature words which can present a kind of emotions/attitudes, for instance, "problem", "concerns", "agree", "approved", "revise", etc. Process management system 400 may determine positive, neutral, or negative emotions/attitudes presented by the feature words by means of natural language emotion analysis. For instance, word "concerns" or "problem" may present a negative emotion/attitude. Conversely, word "agree" or "approved" may present a positive emotion/attitude. Word "revise" may present a neutral emotion/attitude at common statuses. Natural language emotion analysis methods may include various machine learning algorithms in the art based on Naïve Bayes, MaxEnt or Support Vector Machines (SVM) etc. The particular details of natural language emotion analysis would be omitted herein for abbreviated description.

At block 712, process management system 400 may record the negative results into a statistical record. In some embodiments, the statistical record may be a statistics matrix which comprise all of the plurality of nodes in the process.

At block 714, process management system 400 may identify potential risk nodes in the process based on the statistical record. In some embodiments, the potential risk nodes may have high occurrence probabilities of the negative results. For instance, it means that the node of the legal reviewer is a potential risk node if the probability of the negative result at the node of the legal reviewer is higher than 50% based on the statistical record. Therefore, the exemplary method of identifying potential risk nodes for process management can increase process performing efficiency by means of identifying the potential risk nodes in processes to caution potential issues before/during performing the process and help users of the exemplary method of identifying potential risk nodes avoid the potential issues in the processes.

It should be noted that the exemplary methods for process management according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, performed concurrently, substantially concurrently, in a partially or wholly temporally overlapping manner, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method performed by one or more processors, the method comprising:
   analyzing a set of communication information that was transferred between a first user and a second user through a computer network;
   identifying, by a theme identifying computer module, a theme of a process based on the set of communication information using natural language processing with machine learning computer algorithms, the set of communication information being generated corresponding to performing the process, wherein the theme is a topic of the process that is comprised of theme features;
   determining, by a role determining computer module, a plurality of roles in the process at least partly based on the set of communication information using the natural language processing with the machine learning computer algorithms, the plurality of roles performing respective actions during performing the process that cause the process to proceed or return to another one of the plurality of roles;
   generating, by a framework generating computer module, a framework of the process based on the theme and the plurality of roles, the framework comprising more than one branch, wherein each of the more than one branch comprises a plurality of nodes respectively corresponding to the plurality of roles and defines an action performing sequence according to an order of the nodes;
   extracting action results at the plurality of nodes based on respective communication information corresponding to each of the plurality of nodes using the natural language processing with the machine learning computer algorithms, the action results at the plurality of nodes being at least partly presented with natural languages in the communication information;
   determining negative results based on the extracted action results by means of natural language emotion analysis;
   recording the negative results into a statistical record; and
   identifying potential risk nodes in the process based on the statistical record separately from non-risk nodes, the potential risk nodes having occurrence probabilities of the negative results that are higher than a threshold value.

2. The method of claim 1, further comprises
   cautioning an initiating user about a risk node in a framework of a new process based on the identifying of potential risk nodes.

3. The method of claim 1, wherein identifying the theme of the process based on the set of communication information comprises:
   extracting the theme features from the set of communication information;
   comparing the theme features with known theme features corresponding to a plurality of known themes comprised in a known theme library to obtain similarity values; and
   in response to the similarity value being greater than a preset threshold, identifying the theme of the process based on the plurality of known themes.

4. The method of claim 1, wherein determining the plurality of roles during performing the process at least partly based on the set of communication information comprises:
   determining a part of the plurality of roles based on a predetermined role arrangement; and
   identifying the rest of the plurality of roles based on the determined part of the plurality of roles and the set of communication information by means of natural language processing.

5. The method of claim 1, further comprises:
   generating one or more common process elements based on the framework, each of the one or more common process elements being a branch of the more than one branch.

6. The method of claim 5, wherein generating one or more common process elements based on the framework comprises:
   comparing the more than one branch with branches comprised in other frameworks corresponding to other processes; and
   in response to determining the more than one branch comprised in the framework and other frameworks corresponding to the other processes based on the comparing, identifying the more than one branch as the one or more common process elements.

7. The method of claim 5, further comprises generating a new process based on the theme and the one or more common process elements, wherein the generating the new process comprises:
   storing the theme and the one or more common process elements into a process element library;
   in response to a certificated operation, updating the process element library by means of modifying themes or common process elements stored in the process element library; and
   generating the new process based on the updated process element library.

8. The method of claim 1, further comprising displaying the process to be graphically operated on a visual user interface.

9. A system comprising: at least one processing unit; and
   a memory coupled to the at least one processing unit and storing instructions thereon, the instructions, when executed by the at least one processing unit, performing acts comprising:
   analyzing a set of communication information that was transferred between a first user and a second user through a computer network;
   identifying, by a theme identifying computer module, a theme of a process based on the set of communication information using natural language processing with machine learning computer algorithms, the set of communication information being generated corresponding to performing the process, wherein the theme is a topic of the process that is comprised of theme features;
   determining, by a role determining computer module, a plurality of roles in the process at least partly based on the set of communication information using the natural language processing with the machine learning computer algorithms, the plurality of roles performing respective actions during performing the process that cause the process to proceed or return to another one of the plurality of roles;

generating, by a framework generating computer module, a framework of the process based on the theme and the plurality of roles, the framework comprising more than one branch, wherein each of the more than one branch comprises a plurality of nodes respectively corresponding to the plurality of roles and defines an action performing sequence according to an order of the nodes;

extracting action results at the plurality of nodes based on respective communication information corresponding to each of the plurality of nodes using the natural language processing with the machine learning computer algorithms, the action results at the plurality of nodes being at least partly presented with natural languages in the communication information; determining negative results based on the extracted action results by means of natural language emotion analysis;

recording the negative results into a statistical record; and identifying potential risk nodes in the process based on the statistical record separately from non-risk nodes, the potential risk nodes having occurrence probabilities of the negative results that are higher than a threshold value.

10. The system of claim 9, wherein identifying the theme of the process based on the set of communication information comprises:

extracting the theme features from contents of the set of communication information;

comparing the theme features with known theme features corresponding to a plurality of known themes comprised in a known theme library to obtain similarity values; and in response to the similarity value being greater than a preset threshold, identifying the theme of the process based on the plurality of known themes.

11. The system of claim 9, wherein determining the plurality of roles during performing the process at least partly based on the set of communication information comprises:

determining a part of the plurality of roles based on a predetermined role arrangement; and identifying the rest of the plurality of roles based on the determined part of the plurality of roles and the set of communication information by means of natural language processing.

12. The system of claim 9, wherein performing acts further comprises:

generating one or more common process elements based on the framework, each of the one or more common process elements being a branch of the more than one branch.

13. The system of claim 12, wherein generating one or more common process elements based on the framework comprises:

comparing the more than one branch with branches comprised in other frameworks corresponding to other processes; and in response to determining the more than one branch comprised in the framework and other frameworks corresponding to the other processes based on the comparing, identifying the more than one branch as the one or more common process elements.

14. The system of claim 12, further comprising generating a new process based on the theme and the one or more common process elements, wherein the generating the new process based on the theme and the one or more common process elements comprises:

storing the theme and the one or more common process elements into a process element library;

in response to a certificated operation, updating the process element library by means of modifying themes or common process elements stored in the process element library; and generating the new process based on the updated process element library.

15. The system of claim 9, wherein performing acts further comprises cautioning an initiating user about a risk node in a framework of a new process based on the identifying of potential risk nodes.

16. A computer program product, the computer program product comprising a computer readable storage medium having program instructions embodied therewith, the program instructions executable by an electronic device to cause the electronic device to perform acts comprising:

analyzing a set of communication information that was transferred between a first user and a second user through a computer network;

identifying, by a theme identifying computer module, a theme of a process based on the set of communication information using natural language processing with machine learning computer algorithms, the set of communication information being generated corresponding to performing the process, wherein the theme is a topic of the process that is comprised of theme features;

determining, by a role determining computer module, a plurality of roles in the process at least partly based on the set of communication information using the natural language processing with the machine learning computer algorithms, the plurality of roles performing respective actions during performing the process that cause the process to proceed or return to another one of the plurality of roles;

generating, by a framework generating computer module, a framework of the process based on the theme and the plurality of roles, the framework comprising more than one branch, wherein each of the more than one branch comprises a plurality of nodes respectively corresponding to the plurality of roles and defines an action performing sequence according to an order of the nodes;

extracting action results at the plurality of nodes based on respective communication information corresponding to each of the plurality of nodes using the natural language processing with the machine learning computer algorithms, the action results at the plurality of nodes being at least partly presented with natural languages in the communication information;

determining negative results based on the extracted action results by means of natural language emotion analysis;

recording the negative results into a statistical record; and identifying potential risk nodes in the process based on the statistical record separately from non-risk nodes, the potential risk nodes having occurrence probabilities of the negative results that are higher than a threshold value.

17. The computer program product of claim 16, wherein identifying the theme of the process based on the set of communication information comprises:

extracting the theme features from contents of the set of communication information;

comparing the theme features with known theme features corresponding to a plurality of known themes comprised in a known theme library to obtain similarity values; and in response to the similarity value being greater than a preset threshold, identifying the theme of the process based on the plurality of known themes.

18. The computer program product of claim 16, wherein determining the plurality of roles during performing the process at least partly based on the set of communication information comprises:

determining a part of the plurality of roles based on a predetermined role arrangement; and identifying the rest of the plurality of roles based on the determined part of the plurality of roles and the set of communication information by means of natural language processing.

19. The computer program product of claim 16, wherein performing acts further comprises:

generating one or more common process elements based on the framework, each of the one or more common process elements being a branch of the more than one branch, further comprising generating a new process, wherein the generating the new process comprises:

storing the theme and the one or more common process elements into a process element library;

updating, in response to a certificated operation, the process element library by means of modifying themes or common process elements stored in the process element library; and generating the new process based on the updated process element library.

20. The computer program product of claim 16, wherein performing acts further comprises cautioning an initiating user about a risk node in a framework of a new process based on the identifying of potential risk nodes.

* * * * *